United States Patent
Kang et al.

(10) Patent No.: US 12,184,393 B2
(45) Date of Patent: Dec. 31, 2024

(54) CONTROL METHOD AND CONTROL DEVICE IN HETEROGENEOUS THREE-DIMENSIONAL HIERARCHICAL NETWORK, AND COMMUNICATION SYSTEM

(71) Applicant: DATANG MOBILE COMMUNICATIONS EQUIPMENT CO., LTD., Beijing (CN)

(72) Inventors: Shaoli Kang, Beijing (CN); Deshan Miao, Beijing (CN); Hai Bi, Beijing (CN); Shaohui Sun, Beijing (CN); Yingmin Wang, Beijing (CN)

(73) Assignee: DATANG MOBILE COMMUNICATIONS EQUIPMENT CO., LTD., Beijing (CN)

( * ) Notice: Subject to any disclaimer, the term of this patent is extended or adjusted under 35 U.S.C. 154(b) by 96 days.

(21) Appl. No.: 17/928,245

(22) PCT Filed: May 8, 2021

(86) PCT No.: PCT/CN2021/092382
§ 371 (c)(1),
(2) Date: Nov. 28, 2022

(87) PCT Pub. No.: WO2021/249076
PCT Pub. Date: Dec. 16, 2021

(65) Prior Publication Data
US 2023/0224023 A1    Jul. 13, 2023

(30) Foreign Application Priority Data
Jun. 10, 2020 (CN) .......................... 202010524153.1

(51) Int. Cl.
*H04B 7/185* (2006.01)
*H04L 5/00* (2006.01)

(52) U.S. Cl.
CPC ..... *H04B 7/18515* (2013.01); *H04B 7/18517* (2013.01); *H04B 7/18539* (2013.01); *H04B 7/18571* (2013.01); *H04L 5/001* (2013.01)

(58) Field of Classification Search
CPC ............ H04B 7/18515; H04B 7/18517; H04B 7/18539; H04L 5/001
See application file for complete search history.

(56) References Cited

U.S. PATENT DOCUMENTS 9,596,142 B2 *  3/2017  Claudel .............. H04B 7/18506
11,881,928 B2 *  1/2024  Gineste .............. H04B 7/18504
(Continued)

FOREIGN PATENT DOCUMENTS

CN   111010708 A   4/2020
CN   212393010 U   1/2021
(Continued)

OTHER PUBLICATIONS

Extended European Search Report for the corresponding European Patent Application No. 21821932.7 issued by the European Patent Office on Nov. 2, 2023.
(Continued)

*Primary Examiner* — Jaison Joseph
(74) *Attorney, Agent, or Firm* — Ladas & Parry, LLP

(57) ABSTRACT

A control method and a control device in a heterogeneous three-dimensional hierarchical network, and a communication system are provided. The control method includes: obtaining a coverage mode of a terminal; when the coverage mode is single-layered sub-network coverage, setting a non-ground mobile communication sub-network or a ground mobile communication sub-network corresponding to the single-layered sub-network coverage to be in a standalone operating mode or an intra-layer carrier aggregation mode; and when the coverage mode is multi-layered sub-network
(Continued)

coverage, setting the non-ground mobile communication sub-network corresponding to the multi-layered sub-network coverage, or the ground mobile communication sub-network and the non-ground mobile communication sub-network corresponding to the multi-layered sub-network coverage, to be in a cross-layer carrier aggregation mode. The ground mobile communication sub-network and the non-ground mobile communication sub-network use a same or unified radio access technology.

19 Claims, 5 Drawing Sheets

(56) References Cited

U.S. PATENT DOCUMENTS

| | | | |
|---|---|---|---|
| 2013/0022016 A1 | 1/2013 | Wei | |
| 2013/0095822 A1* | 4/2013 | Swardh | H04B 7/18543 455/428 |
| 2017/0245185 A1* | 8/2017 | Chuberre | H04L 43/0882 |
| 2019/0028991 A1* | 1/2019 | Breitbach | H04W 60/005 |
| 2020/0100291 A1 | 3/2020 | Ravishankar et al. | |
| 2021/0099933 A1* | 4/2021 | Matsuda | H04W 36/0072 |
| 2021/0219228 A1* | 7/2021 | Matsuda | H04W 48/12 |
| 2021/0345215 A1 | 11/2021 | Sun et al. | |
| 2023/0188204 A1* | 6/2023 | Katzav | H04B 7/18504 455/427 |
| 2023/0224023 A1* | 7/2023 | Kang | H04B 7/18573 375/262 |
| 2024/0022318 A1* | 1/2024 | Yu | H04B 7/18519 |

FOREIGN PATENT DOCUMENTS

| | | |
|---|---|---|
| EP | 3293891 B1 | 2/2019 |
| JP | 2013524701 A | 6/2013 |
| WO | 2019193891 A1 | 10/2019 |
| WO | 202026734 A1 | 2/2020 |
| WO | 2020026734 A1 | 2/2020 |
| WO | 2020068149 A1 | 4/2020 |

OTHER PUBLICATIONS

"Non-Terrestrial Networks: Consideration on NR Impacts" 3GPP TSG RAN Meeting 77, RP-171579, Sapporo, Japan, Sep. 11-15, 2017, Source: Thales, Fraunhofer IIS, Nomor Research, Dish Network, HNS, Agenda Item: 9.3.1, all pages.

First Japanese Office Action for the corresponding Japanese Patent Application No. 2022-575363 issued by the Japanese Patent Office on Dec. 12, 2023 and its English translation provided by the foreign associate.

"Dual Connectivity Benefit and feature exploration" 3GPP TSG RAN WG2 Meeting #81bis, R2-131167, Chicago, USA, Apr. 15-19, 2013, Agenda Item: 7.2, Source: MediaTek, all pages.

"Dual connectivity use cases in NTN" 3GPP TSG-RAN WG2 Meeting #107, R2-1911298, Prague, Czech Republic, Aug. 26-Aug. 30, 2019 Resubmission of R2-1907897, Agenda item: 11.6.4.3 (FS_NR_NTN_solutions), Source: LG Electronics Inc, all pages.

International Search Report for PCT/CN2021/092382 issued on Aug. 11, 2021 and its English Translation provided by WIPO.

Written Opinion for PCT/CN2021/092382 issued on Aug. 11, 2021 and its English Translation provided by WIPO.

International Report on Patentibily for PCT/CN2021/092382 issued on Dec. 13, 2022 and its English translation provided by WIPO.

* cited by examiner

CONTROL METHOD AND CONTROL DEVICE IN HETEROGENEOUS THREE-DIMENSIONAL HIERARCHICAL NETWORK, AND COMMUNICATION SYSTEM

CROSS-REFERENCE TO RELATED APPLICATIONS

This application is the U.S. national phase of PCT Application No. PCT/CN2021/092382 filed on May 8, 2021, which claims a priority of the Chinese patent application No. 202010524153.1 filed in China on Jun. 10, 2020, the disclosures of which are incorporated herein by reference in their entireties.

TECHNICAL FIELD

The present disclosure relates to the field of communication technology, in particular to a control method and a control device in a heterogeneous three-dimensional hierarchical network, and a communication system.

BACKGROUND

Each of a ground mobile communication system and a non-ground communication system, represented by a satellite mobile communication system, is used as an individual network and an individual system for processing all the time, and interaction between the systems mainly includes interconnection. For example, when a terminal supports satellite mobile communication and ground mobile communication simultaneously, the two communication modes exist as separate modes, and the terminal merely operates in one of the modes at a certain time point. The terminal is switched between the two modes as desired.

SUMMARY

An object of the present disclosure is to provide a control method and a control device in a heterogeneous three-dimensional hierarchical network, and a communication system, so as to prevent the occurrence of a resource waste due to an operating mode of the dual system consisting of the non-ground communication system and the ground mobile communication system in related art.

In a first aspect, the present disclosure provides in some embodiments a control method in a heterogeneous three-dimensional hierarchical network for a network control unit, the heterogeneous three-dimensional hierarchical network including a ground mobile communication sub-network and a non-ground mobile communication sub-network, the control method including: obtaining a coverage mode of a terminal; when the coverage mode is single-layered sub-network coverage, setting the non-ground mobile communication sub-network or the ground mobile communication sub-network corresponding to the single-layered sub-network coverage to be in a standalone operating mode or an intra-layer carrier aggregation mode; and when the coverage mode is multi-layered sub-network coverage, setting the non-ground mobile communication sub-network corresponding to the multi-layered sub-network coverage, or the ground mobile communication sub-network and the non-ground mobile communication sub-network corresponding to the multi-layered sub-network coverage, to be in a cross-layer carrier aggregation mode. The ground mobile communication sub-network and the non-ground mobile communication sub-network use a same or unified radio access technology.

In a possible embodiment of the present disclosure, the control method further includes: obtaining a coverage range of the ground mobile communication sub-network and/or the non-ground mobile communication sub-network; and selecting a signal from the sub-network with a largest coverage range as a main carrier.

In a possible embodiment of the present disclosure, the control method further includes configuring one or more main carriers for the ground mobile communication sub-network and/or the non-ground mobile communication sub-network.

In a possible embodiment of the present disclosure, the main carrier is used by the terminal for access, synchronization, control or data transmission at a first rate, an auxiliary carrier corresponding to the main carrier is used by the terminal for the data transmission at a second rate, and the first rate is smaller than the second rate.

In a possible embodiment of the present disclosure, the control method further includes notifying the terminal of an operating mode and/or an operating bandwidth of a cell where the terminal is located.

In a possible embodiment of the present disclosure, the control method further includes transmitting first information, and the first information is used to indicate one or more of an operating frequency of the ground mobile communication sub-network and/or the non-ground mobile communication sub-network, a service time of the non-ground mobile communication sub-network, or a beam angle of the non-ground mobile communication sub-network.

In a possible embodiment of the present disclosure, the control method further includes: obtaining an operating state of the ground mobile communication sub-network and/or the non-ground mobile communication sub-network; and transmitting second information in accordance with the operating state, the second information being used to instruct the terminal to hand over between the sub-networks.

In a possible embodiment of the present disclosure, the control method further includes dynamically or statically configuring an operating bandwidth of the non-ground mobile communication sub-network and/or the ground mobile communication sub-network.

In a second aspect, the present disclosure provides in some embodiments a control method in a heterogeneous three-dimensional hierarchical network for a terminal, the heterogeneous three-dimensional hierarchical network including a ground mobile communication sub-network and a non-ground mobile communication sub-network, the control method including: obtaining an operating mode and/or an operating bandwidth of a cell where the terminal is located; and obtaining an operating mode of the terminal and/or a sub-network where the terminal is located in accordance with the operating mode and/or the operating bandwidth of the cell where the terminal is located. The ground mobile communication sub-network and the non-ground mobile communication sub-network use a same or unified radio access technology.

In a possible embodiment of the present disclosure, the control method further includes: when the operating mode of the terminal is a standalone operating mode, performing control and/or data transmission on a corresponding sub-network; when the operating mode of the terminal is an intra-layer carrier aggregation mode, performing access, synchronization, control and/or data transmission at a first rate on a main carrier, and performing data transmission at a second rate on an auxiliary carrier corresponding to the main carrier, the first rate being smaller than the second rate; or when the operating mode of the terminal is a cross-layer carrier aggregation mode, performing access, synchronization, control and/or data transmission at the first rate on a sub-network where the main carrier is located, and performing data transmission at the second rate on a sub-network where the auxiliary carrier corresponding to the main carrier is located, the first rate being smaller than the second rate.

In a third aspect, the present disclosure provides in some embodiments a communication system, including a heterogeneous three-dimensional hierarchical network, a terminal and a network control unit. The heterogeneous three-dimensional hierarchical network includes a ground mobile communication sub-network and a non-ground mobile communication sub-network, the terminal is in communication with the ground mobile communication sub-network and the non-ground mobile communication sub-network, the network control unit is in communication with the ground mobile communication sub-network and the non-ground mobile communication sub-network, and the ground mobile communication sub-network and the non-ground mobile communication sub-network use a same or unified radio access technology.

In a possible embodiment of the present disclosure, the network control unit is arranged independent of a network side device in the ground mobile communication sub-network and a network side device in the non-ground mobile communication sub-network, or the network control unit is arranged in the network side device in the ground mobile communication sub-network or the network side device in the non-ground mobile communication sub-network.

In a possible embodiment of the present disclosure, a cell coverage region formed by the non-ground mobile communication sub-network is greater than a cell coverage region formed by the ground mobile communication sub-network, or the cell coverage region formed by the non-ground mobile communication sub-network partially overlaps the cell coverage region formed by the ground mobile communication sub-network, or the cell coverage region formed by the non-ground mobile communication sub-network does not overlap the cell coverage region formed by the ground mobile communication sub-network.

In a possible embodiment of the present disclosure, a network type of the ground mobile communication sub-network includes one or more of a macrocell network, a microcell network or a device-to-device network.

In a possible embodiment of the present disclosure, the non-ground mobile communication sub-network includes an aerospace device, or the aerospace device and a ground gateway, and the aerospace device includes one or more of a satellite constellation, a high altitude platform station or an aircraft.

In a possible embodiment of the present disclosure, a network coverage mode of the satellite constellation includes one of a single-layer sub-network coverage of satellite constellations at a same orbital altitude, a multi-layer sub-network coverage of the satellite constellations at a same earth orbit, or a multi-layer sub-network coverage of the satellite constellations at different earth orbits.

In a possible embodiment of the present disclosure, the single-layer sub-network coverage of the satellite constellations at a same earth orbit includes one of a single-layer sub-network coverage of a GEO constellation, a single-layer sub-network coverage of an MEO constellation, or a single-layer sub-network coverage of an LEO constellation.

In a possible embodiment of the present disclosure, the multi-layer sub-network coverage of the satellite constellations at a same earth orbit includes sub-network coverage of control beams and point beams of the satellite constellations at a same earth orbit.

In a possible embodiment of the present disclosure, the multi-layer sub-network coverage of the satellite constellations at different earth orbits includes one of a three-layer sub-network coverage of a GEO constellation, an MEO constellation and an LEO constellation, a two-layer sub-network coverage of a GEO constellation and an MEO constellation, a two-layer sub-network coverage of a GEO constellation and an LEO constellation, a two-layer sub-network coverage of an MEO constellation and an LEO constellation, or two-layer sub-network coverage of an LEO constellation and an LEO constellation.

In a possible embodiment of the present disclosure, the network control unit dynamically or statically configures an operating bandwidth of the non-ground mobile communication sub-network and an operating bandwidth of the ground mobile communication sub-network.

In a possible embodiment of the present disclosure, a total bandwidth actually occupied by the operating bandwidth of the non-ground mobile communication sub-network and/or the operating bandwidth of the ground mobile communication sub-network is smaller than or equal to an operating bandwidth of the communication system.

In a possible embodiment of the present disclosure, the non-ground mobile communication sub-network and the ground mobile communication sub-network provide services for a terminal in a coverage region in a standalone operating mode or a carrier aggregation mode.

In a possible embodiment of the present disclosure, a signal provided by the non-ground mobile communication sub-network or the ground mobile communication sub-network is used as a main carrier.

In a possible embodiment of the present disclosure, the main carrier is used by the terminal for data transmission at a first rate, access, synchronization, or control, an auxiliary carrier corresponding to the main carrier is used by the terminal for data transmission at a second rate, and the first rate is smaller than the second rate.

In a fourth aspect, the present disclosure provides in some embodiments a control device in a heterogeneous three-dimensional hierarchical network for a network control unit, the heterogeneous three-dimensional hierarchical network including a ground mobile communication sub-network and a non-ground mobile communication sub-network, the control device including: a first obtaining module configured to obtain a coverage mode of a terminal; and a first processing module configured to: when the coverage mode is single-layered sub-network coverage, set the non-ground mobile communication sub-network or the ground mobile communication sub-network corresponding to the single-layered sub-network coverage to be in a standalone operating mode or an intra-layer carrier aggregation mode; and when the coverage mode is multi-layered sub-network coverage, set the non-ground mobile communication sub-network corresponding to the multi-layered sub-network coverage, or the ground mobile communication sub-network and the non-ground mobile communication sub-network corresponding to the multi-layered sub-network coverage, to be in a cross-layer carrier aggregation mode. The ground mobile communication sub-network and the non-ground mobile communication sub-network use a same or unified radio access technology.

In a possible embodiment of the present disclosure, the control device further includes: a second obtaining module configured to obtain a coverage range of the ground mobile communication sub-network and/or the non-ground mobile communication sub-network; and a second processing module configured to select a signal from the sub-network with a largest coverage range as a main carrier.

In a possible embodiment of the present disclosure, the control device further includes a first configuration module configured to configure one or more main carriers for the ground mobile communication sub-network and/or the non-ground mobile communication sub-network.

In a possible embodiment of the present disclosure, the control device further includes a first transmission module configured to notify the terminal of an operating mode and/or an operating bandwidth of a cell where the terminal is located.

In a possible embodiment of the present disclosure, the control device further includes a second transmission module configured to transmit first information, and the first information is used to indicate one or more of an operating frequency of the ground mobile communication sub-network and/or the non-ground mobile communication sub-network, a service time of the non-ground mobile communication sub-network, or a beam angle of the non-ground mobile communication sub-network.

In a possible embodiment of the present disclosure, the control device further includes: a third obtaining module configured to obtain an operating state of the ground mobile communication sub-network and/or the non-ground mobile communication sub-network; and a third transmission module configured to transmit second information in accordance with the operating state, the second information being used to instruct the terminal to hand over between the sub-networks.

In a possible embodiment of the present disclosure, the control device further includes a second configuration module configured to dynamically or statically configure an operating bandwidth of the non-ground mobile communication sub-network and/or the ground mobile communication sub-network.

In a fifth aspect, the present disclosure provides in some embodiments a network control unit for a heterogeneous three-dimensional hierarchical network, the heterogeneous three-dimensional hierarchical network including a ground mobile communication sub-network and a non-ground mobile communication sub-network, the network control unit including a first transceiver and a first processor. The first transceiver is configured to transmit and receive data under the control of the first processor. The first processor is configured to read a program in a memory, so as to: obtain a coverage mode of a terminal; when the coverage mode is single-layered sub-network coverage, set the non-ground mobile communication sub-network or the ground mobile communication sub-network corresponding to the single-layered sub-network coverage to be in a standalone operating mode or an intra-layer carrier aggregation mode; and when the coverage mode is multi-layered sub-network coverage, set the non-ground mobile communication sub-network corresponding to the multi-layered sub-network coverage, or the ground mobile communication sub-network and the non-ground mobile communication sub-network corresponding to the multi-layered sub-network coverage, to be in a cross-layer carrier aggregation mode. The ground mobile communication sub-network and the non-ground mobile communication sub-network use a same or unified radio access technology.

In a possible embodiment of the present disclosure, the first processor is further configured to read the program in the memory to: obtain a coverage range of the ground mobile communication sub-network and/or the non-ground mobile communication sub-network; and select a signal from the sub-network with a largest coverage range as a main carrier.

In a possible embodiment of the present disclosure, the first processor is further configured to read the program in the memory to: configure one or more main carriers for the ground mobile communication sub-network and/or the non-ground mobile communication sub-network.

In a possible embodiment of the present disclosure, the first processor is further configured to read the program in the memory to: notify the terminal of an operating mode and/or an operating bandwidth of a cell where the terminal is located.

In a possible embodiment of the present disclosure, the first processor is further configured to read the program in the memory to: transmit first information, and the first information is used to indicate one or more of an operating frequency of the ground mobile communication sub-network and/or the non-ground mobile communication sub-network, a service time of the non-ground mobile communication sub-network, or a beam angle of the non-ground mobile communication sub-network.

In a possible embodiment of the present disclosure, the first processor is further configured to read the program in the memory to: obtain an operating state of the ground mobile communication sub-network and/or the non-ground mobile communication sub-network; and transmit second information in accordance with the operating state, the second information being used to instruct the terminal to hand over between the sub-networks.

In a possible embodiment of the present disclosure, the first processor is further configured to read the program in the memory to: dynamically or statically configures an operating bandwidth of the non-ground mobile communication sub-network and/or the ground mobile communication sub-network.

In a sixth aspect, the present disclosure provides in some embodiments a control device in a heterogeneous three-dimensional hierarchical network for a terminal, the heterogeneous three-dimensional hierarchical network including a ground mobile communication sub-network and a non-ground mobile communication sub-network, the control device including: a fourth obtaining module configured to obtain an operating mode and/or an operating bandwidth of a cell where the terminal is located; and a third processing module configured to obtain an operating mode of the terminal and/or a sub-network where the terminal is located in accordance with the operating mode and/or the operating bandwidth of the cell where the terminal is located. The ground mobile communication sub-network and the non-ground mobile communication sub-network use a same or unified radio access technology.

In a possible embodiment of the present disclosure, the control device further includes a fourth processing module configured to: when the operating mode of the terminal is a standalone operating mode, perform control and/or data transmission on a corresponding sub-network; when the operating mode of the terminal is an intra-layer carrier aggregation mode, perform access, synchronization, control and/or data transmission at a first rate on a main carrier, and perform data transmission at a second rate on an auxiliary carrier corresponding to the main carrier, the first rate being smaller than the second rate; or when the operating mode of the terminal is a cross-layer carrier aggregation mode, perform access, synchronization, control and/or data transmission at the first rate on a sub-network where the main carrier is located, and perform data transmission at the second rate on a sub-network where the auxiliary carrier corresponding to the main carrier is located, the first rate being smaller than the second rate.

In a seventh aspect, the present disclosure provides in some embodiments a terminal for a heterogeneous three-dimensional hierarchical network, the heterogeneous three-dimensional hierarchical network including a ground mobile communication sub-network and a non-ground mobile communication sub-network, the control device including a second transceiver and a second processor. The second transceiver is configured to transmit and receive data under the control of the second processor. The second processor is configured to read a program in a memory, so as to: obtain an operating mode and/or an operating bandwidth of a cell where the terminal is located; and obtain an operating mode of the terminal and/or a sub-network where the terminal is located in accordance with the operating mode and/or the operating bandwidth of the cell where the terminal is located. The ground mobile communication sub-network and the non-ground mobile communication sub-network use a same or unified radio access technology.

In a possible embodiment of the present disclosure, the second processor is configured to read the program in the memory to: when the operating mode of the terminal is a standalone operating mode, perform control and/or data transmission on a corresponding sub-network; when the operating mode of the terminal is an intra-layer carrier aggregation mode, perform access, synchronization, control and/or data transmission at a first rate on a main carrier, and perform data transmission at a second rate on an auxiliary carrier corresponding to the main carrier, the first rate being smaller than the second rate; or when the operating mode of the terminal is a cross-layer carrier aggregation mode, perform access, synchronization, control and/or data transmission at the first rate on a sub-network where the main carrier is located, and perform data transmission at the second rate on a sub-network where the auxiliary carrier corresponding to the main carrier is located, the first rate being smaller than the second rate.

In an eighth aspect, the present disclosure provides a readable storage medium storing therein a computer program. The computer program is executed by a processor so as to implement the steps of the above-mentioned control method.

According to the embodiments of the present disclosure, the non-ground mobile communication sub-network and the ground mobile communication sub-network use a same or unified radio access technology, e.g., a $4^{th}$-Generation (4G), $5^{th}$-Generation (5G) or $6^{th}$-Generation (6G) radio access technology, and a heterogeneous three-dimensional coverage formed through the non-ground mobile communication sub-network and the ground mobile communication sub-network is considered as a unified network system for the communication. As a result, it is able to prevent the occurrence of a waste in terms of radio resources, system construction and device implementation due to an operating mode of the dual system consisting of the non-ground communication system and the ground mobile communication system in the related art.

BRIEF DESCRIPTION OF THE DRAWINGS

Through reading the detailed description hereinafter, other advantages and benefits will be apparent to a person skilled in the art. The drawings are merely used to show the optional embodiments, but shall not be construed as limiting the present disclosure. In addition, in the drawings, same reference symbols represent same members. In these drawings.

DETAILED DESCRIPTION

Figure 1:
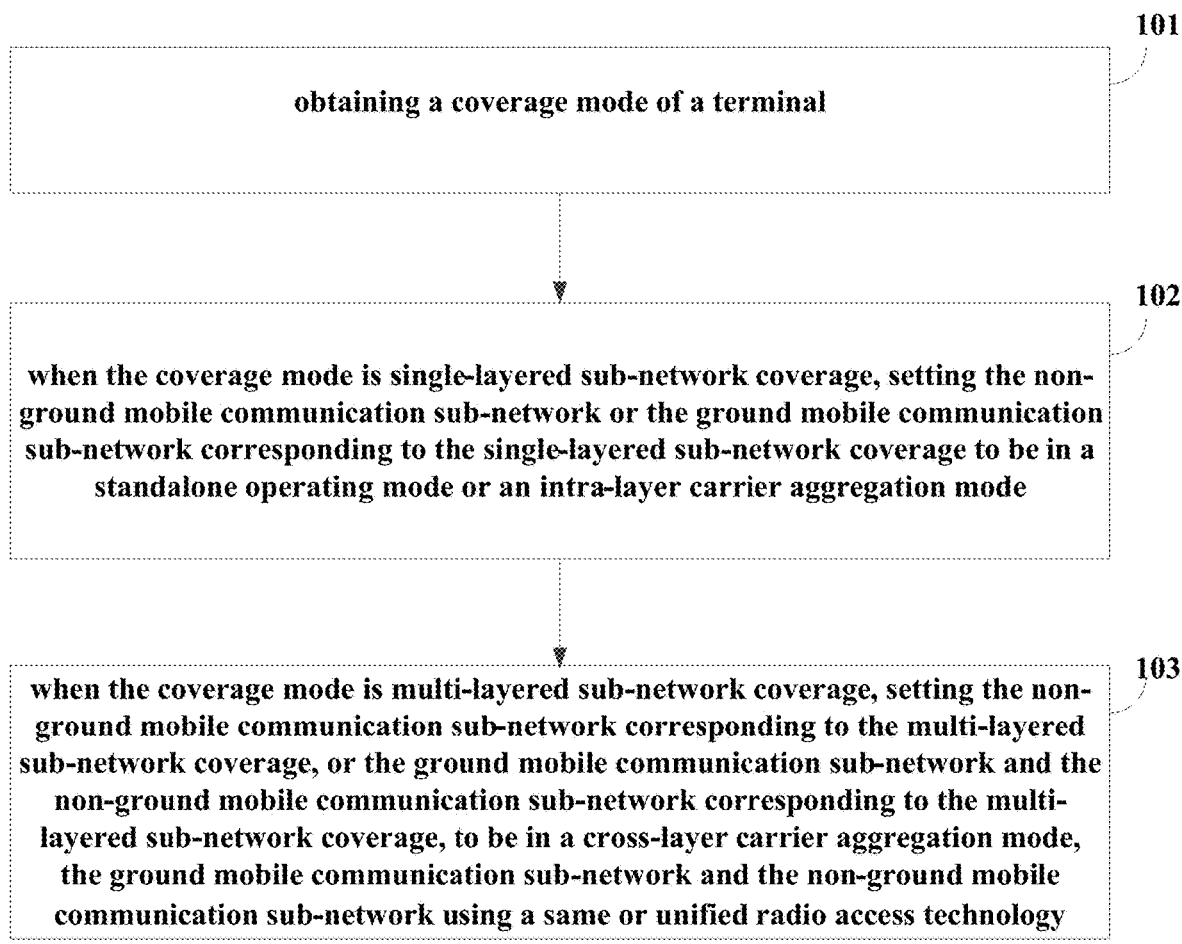
FIG. 1 is a flow chart of a control method in a heterogeneous three-dimensional hierarchical network according to an embodiment of the present disclosure.

The embodiments of the present disclosure will be described hereinafter in a clear and complete manner in conjunction with the drawings and embodiments. Obviously, the following embodiments merely relate to a part of, rather than all of, the embodiments of the present disclosure, and based on these embodiments, a person skilled in the art may, without any creative effort, obtain the other embodiments, which also fall within the scope of the present disclosure.

Such terms as "include" or "including" or any other variations involved in the specification and the appended claims intend to provide non-exclusive coverage, so that a procedure, method, system, product or device including a series of steps or units may also include any other elements not listed herein, or may include any inherent steps or units of the procedure, method, system, product or device. In addition, the expression "and/or" is merely used to describe the relationship between objects, and it may include three situations. For example, "A and/or B" may represent that, there is only A, there are both A and B, and there is only B.

Such expressions as "illustrative" and "for example" are merely used to show examples or explanations. Any illustrative embodiment or scheme in the present disclosure shall not be construed as being superior over the other embodiment or scheme. Definitely, these words intend to exhibit relevant concepts in a concrete manner.

The technology described in the context shall not be limited to a 5G New Radio (NR) system, and it may also be applied to various radio communication systems, e.g., Long Term Evolution (LTE)/LTE-Advanced (LTE-A) system, Code Division Multiple Access (CDMA), Time Division Multiple Access (TDMA), Frequency Division Multiple Access (FDMA), Orthogonal Frequency Division Multiple Access (OFDMA), Single-Carrier Frequency-Division Multiple Access (SC-FDMA), or any other system.

The terms "system" and "network" may be replaced with each other. The CDMA system may be used to implement such radio technologies as CDMA2000 and Universal Terrestrial Radio Access (UTRA). The UTRA may include Wideband Code Division Multiple Access (WCDMA) and the other CDMA variants. The TDMA system may be used to implement such a radio technology as Global System for Mobile Communication (GSM). The OFDMA system may be used to implement such radio technologies as Ultra Mobile Broadband (UMB), Evolved-UTRA (E-UTRA), IEEE 802.11 (Wireless Fidelity (Wi-Fi)), IEEE 802.16 (Worldwide Interoperability for Microwave Access (WiMAX)), IEEE 802.20, and Flash-OFDM. The UTRA and the E-UTRA are parts of a Universal Mobile Telecommunications System (UMTS). The LTE and a more advanced LTE (e.g., LTE-A) are new UMTS versions using the E-UTRA. The UTRA, E-UTRA, UMTS, LTE, LTE-A and GSM have been described in literatures from the $3^{rd}$-Generation Partnership Project (3GPP). The technology described in the context may be applied to the above-mentioned systems and radio technologies, or applied to the other systems and radio technologies.

A heterogeneous three-dimensional hierarchical network in the context includes a ground mobile communication sub-network and a non-ground mobile communication sub-network.

A terminal in the context not only supports the communication with the non-ground mobile communication sub-network but also supports the communication with the ground mobile communication sub-network.

In a possible embodiment of the present disclosure, a cell coverage region formed by the non-ground mobile communication sub-network is greater than a cell coverage region formed by the ground mobile communication sub-network. Alternatively, the cell coverage region formed by the ground mobile communication sub-network includes the coverage region formed by the non-ground mobile communication sub-network, or the cell coverage region formed by the non-ground mobile communication sub-network does not include the coverage region formed by the ground mobile communication sub-network.

The ground mobile communication sub-network transmits and receives a signal for the terminal using a cellular base station (e.g., a macrocell base station or a microcell base station) or a terminal of Device-To-Device (D2D) communication. The non-ground mobile communication sub-network transmits and receives a signal for the terminal using an aerospace device such as satellite, high-altitude platform, unmanned aerial vehicle or civil aircraft, and transmits and receives a feeding signal for the aerospace device using a ground gateway.

As shown in FIG. 1, the present disclosure provides in some embodiments a control method in a heterogeneous three-dimensional hierarchical network. The method is executed by a network control unit, and it includes Step 101, Step 102 and Step 103.

Step 101: obtaining a coverage mode of a terminal.

In the embodiments of the present disclosure, the network control unit is used for coordinated processing on communication between the terminal and each of a non-ground mobile communication sub-network and a ground mobile communication sub-network. In a possible embodiment of the present disclosure, the network control unit includes a network unit, e.g., a network control unit, of a sub-network at each layer. Further, the network control unit may be an individual device, or its function may be integrated in the sub-network at each layer.

In the embodiments of the present disclosure, the coverage mode of the terminal refers to a mode in which the terminal is covered by the heterogeneous three-dimensional hierarchical network, and it includes a single-layer sub-network coverage and a multi-layer sub-network coverage. The single-layer sub-network coverage refers to a coverage of the ground mobile communication sub-network or the non-ground mobile communication sub-network, and the multi-layer sub-network coverage refers to a coverage of the non-ground mobile communication sub-network or coverages of both the ground mobile communication sub-network and the non-ground mobile communication sub-network.

For example, the non-ground mobile communication sub-network is a satellite communication sub-network, and a network side device in the satellite communication sub-network includes a satellite constellation and a ground gateway. The satellite constellation is used to transmit and receive a signal for the terminal and a signal for the ground gateway, and the ground gateway is used to transmit and receive a feeding signal for a satellite.

For a transparent forwarding satellite constellation, a communication link transmission mode of the satellite communication sub-network is "terminal-satellite constellation-gateway", or for an on-board processing satellite constellation, a communication link transmission mode of the satellite communication sub-network is "terminal-satellite constellation".

It should be appreciated that, the satellite constellation may form a single-layer coverage at a same earth orbit, a multi-layer coverage at a same earth orbit and a multi-layer coverage at different earth orbits, i.e., the satellite communication sub-network includes a multi-layers sub-network of the satellite constellation at different orbital heights. The multi-layer sub-network includes one of: (1) a three-layer sub-network consisting of a Geostationary Earth Orbit (GEO) constellation, a Medium Earth Orbit (MEO) constellation and a Low Earth Orbit (LEO) constellation; (2) a two-layer sub-network consisting of a GEO constellation and an MEO constellation; (3) a two-layer sub-network consisting of a GEO constellation and an LEO constellation; (4) a two-layer sub-network consisting of an MEO constellation and an LEO constellation; and (5) a two-layer sub-network consisting of an LEO constellation and an LEO constellation.

It should be appreciated that, the satellite constellations at different earth orbits may use a same ground gateway or different ground gateways for the processing.

In the embodiments of the present disclosure, the terminal supports a standalone operating mode, an intra-layer carrier aggregation mode and a cross-layer carrier aggregation mode. The intra-layer carrier aggregation mode is also called as a carrier aggregation mode in a single-layer sub-network. The cross-layer carrier aggregation mode refers to a carrier aggregation mode between different layers, e.g., a carrier aggregation mode between multiple layers of non-ground mobile communication sub-networks, or a carrier aggregation mode between the ground mobile communication sub-network and the non-ground mobile communication sub-network.

Step 102: when the coverage mode is single-layered sub-network coverage, setting the non-ground mobile communication sub-network or the ground mobile communication sub-network corresponding to the single-layered sub-network coverage to be in the standalone operating mode or the intra-layer carrier aggregation mode.

The standalone operating mode refers to a mode in which a service is provided by a single-layer sub-network for the terminal, and the intra-layer carrier aggregation mode refers to a mode in which the service is provided for the terminal through the intra-layer carrier aggregation mode of the single-layer sub-network.

Step 103: when the coverage mode is multi-layered sub-network coverage, setting the non-ground mobile communication sub-network corresponding to the multi-layered sub-network coverage, or the ground mobile communication sub-network and the non-ground mobile communication sub-network corresponding to the multi-layered sub-network coverage, to be in the cross-layer carrier aggregation mode.

The ground mobile communication sub-network and the non-ground mobile communication sub-network use a same or unified radio access technology.

The cross-layer carrier aggregation mode is also called as inter-layer carrier aggregation mode.

In a possible embodiment of the present disclosure, in Step 103, a signal from the sub-network with a largest coverage range is taken as a main carrier in the cross-layer carrier aggregation mode.

In other words, the network control unit determines whether to perform cross-layer carrier aggregation in accordance with whether the sub-network where the terminal currently operates is single-layer coverage or multi-layer coverage. In the case of only the single-layer coverage, the sub-network corresponding to the coverage is set to be in the standalone operating mode or the intra-layer carrier aggregation mode. In the case of the multi-layer coverage, the sub-network corresponding to each layer of coverage is set to be in the cross-layer carrier aggregation mode.

In some embodiments of the present disclosure, subsequent to Step 101 or Step 103, the control method in FIG. 1 further includes: obtaining a coverage range of the ground mobile communication sub-network and/or the non-ground mobile communication sub-network; and selecting a signal from the sub-network with a largest coverage range as a main carrier.

In some embodiments of the present disclosure, the control method in FIG. 1 further includes configuring one or more main carriers for the ground mobile communication sub-network and/or the non-ground mobile communication sub-network. It should be appreciated that, a mode for configuring the main carrier and an order of the steps will not be particularly defined herein.

In some embodiments of the present disclosure, the main carrier is used by the terminal for data transmission at a first rate (e.g., a low rate), access, synchronization, or control, an auxiliary carrier corresponding to the main carrier is used by the terminal for the data transmission at a second rate (e.g., a high rate), and the first rate is smaller than the second rate.

In some embodiments of the present disclosure, the control method in FIG. 1 further includes notifying the terminal of an operating mode and/or an operating bandwidth of a cell where the terminal is located. It should be appreciated that, a notification mode of the network control unit and an order of the steps will not be particularly defined herein.

In some embodiments of the present disclosure, the control method in FIG. 1 further includes transmitting first information, and the first information is used to indicate one or more of (1) an operating frequency of the ground mobile communication sub-network and/or the non-ground mobile communication sub-network, (2) a service time of the non-ground mobile communication sub-network, or (3) a beam angle of the non-ground mobile communication sub-network.

In other words, a plurality of sub-networks is coordinated through the network control unit based on the operating frequency, the service time and the beam angle of the non-ground network, so as to determine an assignment mode for the operating frequency, the service time and the beam angle of the non-ground network, thereby to prevent the occurrence of the interference among the sub-networks.

It should be appreciated that, a mode of notifying the first information by the network control unit and an order of the steps will not be particularly defined herein.

In some embodiments of the present disclosure, the control method in FIG. 1 further includes: obtaining an operating state of the ground mobile communication sub-network and/or the non-ground mobile communication sub-network; and transmitting second information in accordance with the operating state, the second information being used to instruct the terminal to hand over between the sub-networks.

In other words, the network control unit may detect a state of each layer of sub-network currently in communication, and when an abnormality occurs, the network control unit transmits coordination information in advance, so as to disable the signal transmission of the layer of sub-network, or prohibit a user to access the layer of sub-network and notify the user to switch to another layer of sub-network.

It should be appreciated that, a mode of notifying, by the network control unit, the second information and an order of the steps will not be particularly defined herein.

In some embodiments of the present disclosure, the control method in FIG. 1 further includes dynamically or statically configuring an operating bandwidth of the non-ground mobile communication sub-network and/or the ground mobile communication sub-network. It should be appreciated that, a mode of configuring, by the network control unit, the operating bandwidth of each layer of sub-network and an order of the steps will not be particularly defined herein.

For example, with respect to static configuration, each layer of sub-network merely operates on an assigned operating bandwidth. With respect to dynamical configuration, each layer of sub-network operates on an entire system bandwidth, but a bandwidth actually occupied by the sub-network is associated with a system capacity and/or a rate demand, i.e., a sum of the bandwidths actually occupied by all the sub-networks is smaller than or equal to the entire system bandwidth. In a possible embodiment of the present disclosure, different carriers or different Bandwidth Parts (BWPs) are configured for different sub-networks.

In a possible embodiment of the present disclosure, for the non-ground mobile communication sub-network and the ground mobile communication sub-network which provide a cell coverage for a same area, a frequency band used by a radio signal for each sub-network is obtained through dividing a bandwidth of a communication system.

For example, the non-ground mobile communication sub-network uses a low frequency band in the system bandwidth.

In a possible embodiment of the present disclosure, the bandwidth division may be static division which is configured in advance, i.e., each of the radio signal for the non-ground mobile communication sub-network and the radio signal for the ground mobile communication sub-network operates on a fixed bandwidth.

In a possible embodiment of the present disclosure, the bandwidth division is dynamic division which changes at any time, i.e., each of the radio signal for the non-ground mobile communication sub-network and the radio signal for the ground mobile communication sub-network operates at a variable bandwidth. For example, the network control unit calculates the operating bandwidth for each of the non-ground mobile communication sub-network and the ground mobile communication sub-network in accordance with the capacity and/or the data transmission rate. For another example, the network control unit dynamically adjusts the operating bandwidth for each of the non-ground mobile communication sub-network and the ground mobile communication sub-network.

It should be appreciated that, the sum of the bandwidths actually occupied by all the sub-networks is smaller than or equal to the entire system bandwidth.

According to the embodiments of the present disclosure, the non-ground mobile communication sub-network and the ground mobile communication sub-network use a same or unified radio access technology, e.g., a 4G, 5G or 6G radio access technology, and a heterogeneous three-dimensional coverage formed through the non-ground mobile communication sub-network and the ground mobile communication sub-network is considered as a unified network system for the communication. As a result, it is able to prevent the occurrence of a waste in terms of radio resources, system construction and device implementation due to an operation mode of the dual system consisting of the non-ground communication system and the ground mobile communication system.

Figure 2:
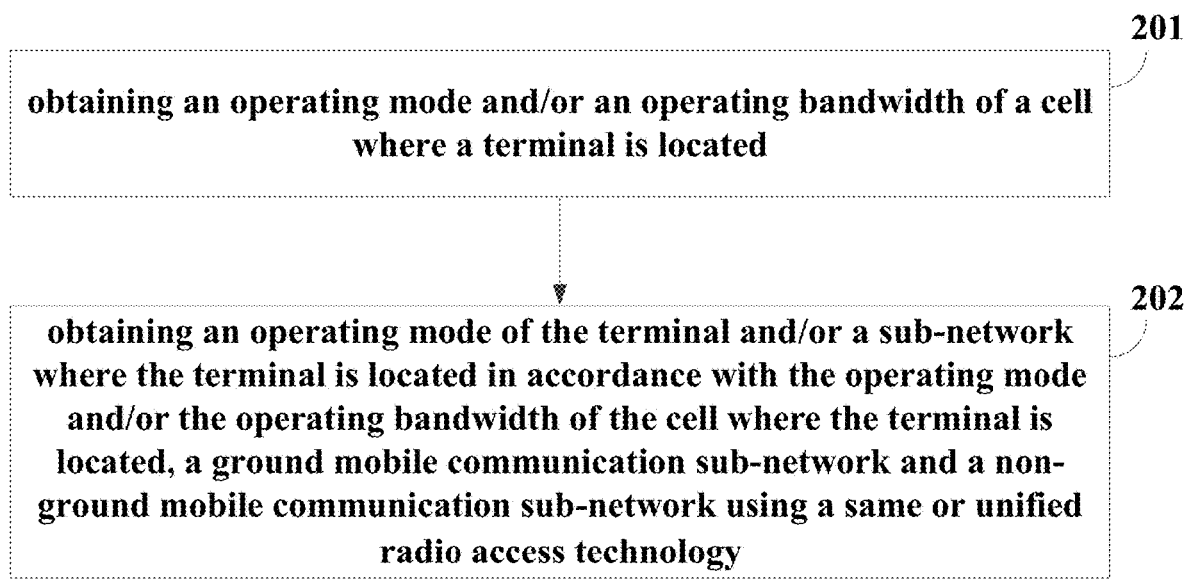
FIG. 2 is another flow chart of the control method in the heterogeneous three-dimensional hierarchical network according to an embodiment of the present disclosure.

As shown in FIG. 2, the present disclosure provides in some embodiments a control method in a heterogeneous three-dimensional hierarchical network, and it is executed by a terminal. The heterogeneous three-dimensional hierarchical network includes a ground mobile communication sub-network and a non-ground mobile communication sub-network. To be specific, the control method includes Step 201 and Step 202.

Step 201: obtaining an operating mode and/or an operating bandwidth of a cell where the terminal is located.

The operating mode of the cell where the terminal is located includes a standalone operating mode, an intra-layer carrier aggregation mode and a cross-layer carrier aggregation mode.

Step 202: obtaining an operating mode of the terminal and/or a sub-network where the terminal is located in accordance with the operating mode and/or the operating bandwidth of the cell where the terminal is located.

The ground mobile communication sub-network and the non-ground mobile communication sub-network use a same or unified radio access technology.

In some embodiments of the present disclosure, the control method in FIG. 2 further includes, when the operating mode of the terminal is the standalone operating mode, performing control and/or data transmission on a corresponding sub-network.

In some embodiments of the present disclosure, the control method in FIG. 2 further includes, when the operating mode of the terminal the intra-layer carrier aggregation mode, performing data transmission at a first rate, access, synchronization, and/or control on a main carrier, and performing data transmission at a second rate on an auxiliary carrier corresponding to the main carrier, and the first rate is smaller than the second rate.

In some embodiments of the present disclosure, the control method in FIG. 2 further includes, when the operating mode of the terminal is the cross-layer carrier aggregation mode, performing data transmission at a first rate (e.g., a low rate), access, synchronization, and/or control on a sub-network where the main carrier is located, and performing data transmission at a second rate (e.g., a high rate) on a sub-network where the auxiliary carrier corresponding to the main carrier is located, and the first rate is smaller than the second rate.

According to the embodiments of the present disclosure, the non-ground mobile communication sub-network and the ground mobile communication sub-network use a same or unified radio access technology, e.g., a 4G, 5G or 6G radio access technology, and a heterogeneous three-dimensional coverage formed through the non-ground mobile communication sub-network and the ground mobile communication sub-network is considered as a unified network system for the communication. As a result, it is able to prevent the occurrence of a waste in terms of radio resources, system construction and device implementation due to an operation mode of the dual system consisting of the non-ground communication system and the ground mobile communication system.

Figure 3:
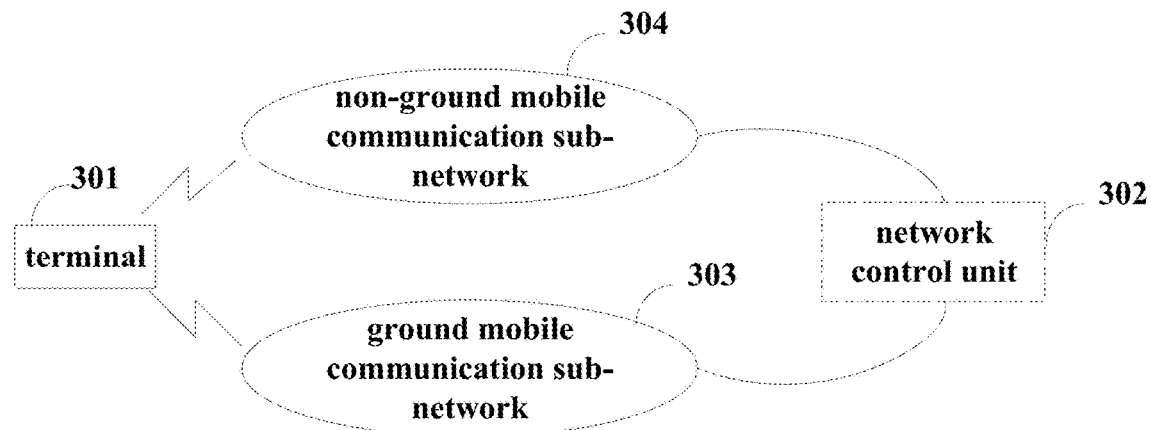
FIG. 3 is a schematic view showing a communication system according to an embodiment of the present disclosure.

As shown in FIG. 3, the present disclosure provides in some embodiments a communication system which includes a heterogeneous three-dimensional hierarchical network, a terminal 301 and a network control unit 302. The heterogeneous three-dimensional hierarchical network includes a ground mobile communication sub-network 303 and a non-ground mobile communication sub-network 304, the terminal 301 is in communication with the ground mobile communication sub-network 303 and the non-ground mobile communication sub-network 304, the network control unit 302 is in communication with the ground mobile communication sub-network 303 and the non-ground mobile communication sub-network 304, and the ground mobile communication sub-network and the non-ground mobile communication sub-network use a same or unified radio access technology.

In some embodiments of the present disclosure, the network control unit 302 is arranged independent of a network side device in the ground mobile communication sub-network and a network side device in the non-ground mobile communication sub-network, or the network control unit is arranged in the network side device in the ground mobile communication sub-network or the network side device in the non-ground mobile communication sub-network.

In some embodiments of the present disclosure, a cell coverage region formed by the non-ground mobile communication sub-network is greater than a cell coverage region formed by the ground mobile communication sub-network, or the cell coverage region formed by the non-ground mobile communication sub-network partially overlaps the cell coverage region formed by the ground mobile communication sub-network, or the cell coverage region formed by the non-ground mobile communication sub-network does not overlap the cell coverage region formed by the ground mobile communication sub-network.

In some embodiments of the present disclosure, a network type of the ground mobile communication sub-network includes one or more of a macrocell network, a microcell network or a device-to-device network.

In some embodiments of the present disclosure, the non-ground mobile communication sub-network includes an aerospace device, or the aerospace device and a ground gateway, and the aerospace device includes one or more of a satellite constellation, a high altitude platform station or an aircraft.

In some embodiments of the present disclosure, a network coverage mode of the satellite constellation includes one of (1) a single-layer sub-network coverage of satellite constellations at a same earth orbit, (2) a multi-layer sub-network coverage of the satellite constellations at a same earth orbit, or (3) a multi-layer sub-network coverage of the satellite constellations at different earth orbits.

In some embodiments of the present disclosure, the single-layer sub-network coverage of the satellite constellations at a same earth orbit includes one of (1) a single-layer sub-network coverage of a GEO constellation, (2) a single-layer sub-network coverage of an MEO constellation, or (3) a single-layer sub-network coverage of an LEO constellation.

In some embodiments of the present disclosure, the multi-layer sub-network coverage of the satellite constellations at a same earth orbit includes sub-network coverage of control beams and point beams of the satellite constellations at a same earth orbit.

In some embodiments of the present disclosure, the multi-layer sub-network coverage of the satellite constellations at different earth orbits includes one of (1) a three-layer sub-network coverage of a GEO constellation, an MEO constellation and an LEO constellation, (2) a two-layer sub-network coverage of a GEO constellation and an MEO constellation, (3) a two-layer sub-network coverage of a GEO constellation and an LEO constellation, (4) a two-layer sub-network coverage of an MEO constellation and an LEO constellation, or (5) a two-layer sub-network coverage of an LEO constellation and an LEO constellation.

In some embodiments of the present disclosure, the network control unit dynamically or statically configures an operating bandwidth of the non-ground mobile communication sub-network and an operating bandwidth of the ground mobile communication sub-network.

In some embodiments of the present disclosure, the operating bandwidth of the non-ground mobile communication sub-network or the operating bandwidth of the ground mobile communication sub-network is at least a part of an operating bandwidth of the communication system, i.e., a total bandwidth actually occupied by the operating bandwidth of the non-ground mobile communication sub-network and/or the operating bandwidth of the ground mobile communication sub-network is smaller than or equal to the operating bandwidth of the communication system.

In some embodiments of the present disclosure, the non-ground mobile communication sub-network and the ground mobile communication sub-network provide services for a terminal in a coverage region in a standalone operating mode or a carrier aggregation mode.

In some embodiments of the present disclosure, a signal provided by the non-ground mobile communication sub-network or the ground mobile communication sub-network is used as a main carrier.

In some embodiments of the present disclosure, the main carrier is used by the terminal for data transmission at a first rate (e.g., a low rate), access, synchronization, or control, an auxiliary carrier corresponding to the main carrier is used by the terminal for data transmission at a second rate (e.g., a high rate), and the first rate is smaller than the second rate.

According to the embodiments of the present disclosure, the non-ground mobile communication sub-network and the ground mobile communication sub-network use a same or unified radio access technology, e.g., a 4G, 5G or 6G radio access technology, and a heterogeneous three-dimensional coverage formed through the non-ground mobile communication sub-network and the ground mobile communication sub-network is considered as a unified network system for the communication. As a result, it is able to prevent the occurrence of a waste in terms of radio resources, system construction and device implementation due to an operation mode of the dual system consisting of the non-ground communication system and the ground mobile communication system.

The following description will be given in conjunction with a first embodiment and a second embodiment.

First Embodiment: Three-Layer Heterogeneous Three-Dimensional Network Consisting of a GEO Constellation, an LEO Constellation and a Ground Cellular Base Station The non-ground mobile communication sub-network includes a GEO constellation, an LEO constellation, and a ground gateway in communication with the GEO constellation and the LEO constellation. The ground mobile communication sub-network includes a ground base station. The network control unit is in communication with the ground gateway and the ground base station.

Figure 4:
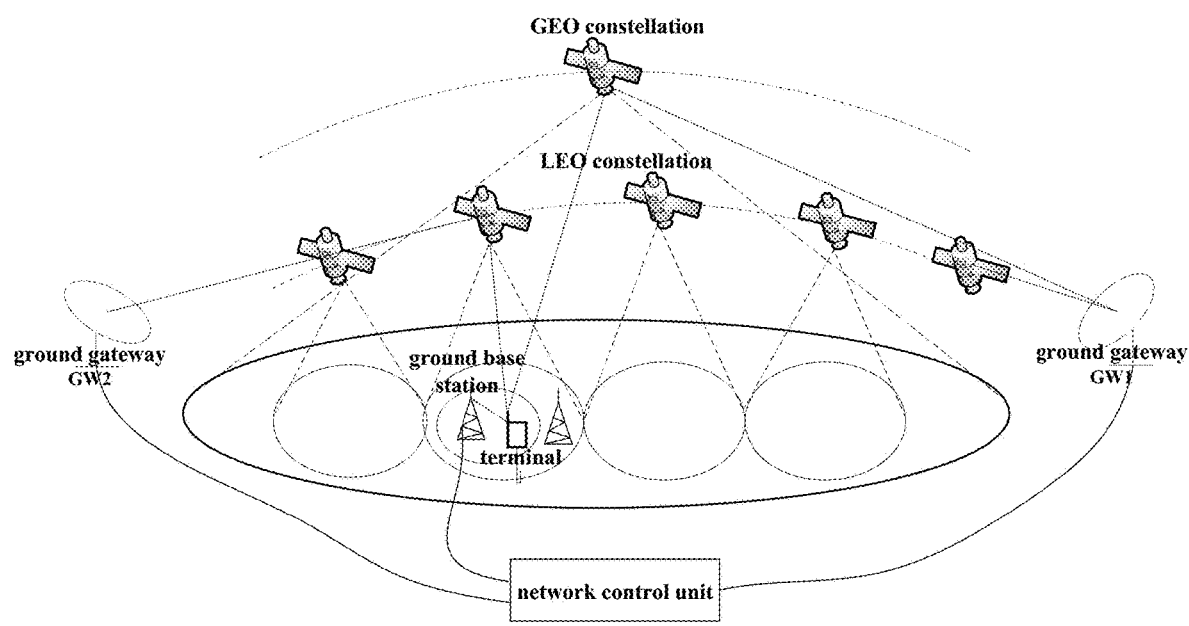
FIG. 4 is a schematic view showing a three-layer heterogeneous three-dimensional network consisting of a GEO constellation, an LEO constellation and a ground cellular base station according to an embodiment of the present disclosure.

As shown in FIG. 4, a communication system includes the GEO constellation, the LEO constellation, the ground gateway, the ground cellular base station, the network control unit and the terminal, i.e., a three-layer heterogeneous three-dimensional hierarchical coverage is formed.

For the terminal, a sub-network consisting of the GEO constellation and the ground gateway forms a first-layer coverage with a largest coverage region, a sub-network consisting of the LEO constellation and the ground gateway forms a second-layer coverage with a second largest coverage region, and the ground cellular base station forms a third-layer coverage with a smallest coverage region. In other words, for a region covered by the ground cellular base station where the terminal is located, there are a coverage formed by a GEO satellite which is located at a fixed position and a coverage formed by an LEO satellite which moves rapidly.

Through the unified, coordinated processing by the network control unit, a bandwidth occupied by the sub-network formed by each layer of coverage is divided statically or dynamically.

When the operating bandwidth of the system is B MHz, in a static mode, the total bandwidth B MHz is fixedly divided into three parts not overlapping each other, i.e., $B_1$, $B_2$ and $B_3$, and $B_1+B_2+B_3 \leq B$. The three bandwidth parts are assigned to the three layers of sub-networks respectively, so that each sub-network is designed merely in accordance with the assigned bandwidth. For example, the GEO constellation sub-network merely operates on the bandwidth $B_1$, the LEO constellation sub-network merely operates on the bandwidth $B_2$, and the ground base station sub-network merely operates on the bandwidth $B_3$.

When the operating bandwidth of the system is B MHz, in a dynamic mode, the three layers of sub-networks are designed in accordance with the entire operating bandwidth B, but an actual operating bandwidth of each sub-network changes dynamically, i.e., the actual operating bandwidth is associated with such factors as a system capacity and a rate demand at a specific region and a specific time. Without loss of generality, when the terminal is located in an $i^{th}$ region and the operating bandwidths of the three layers of sub-networks are $B_{1,i}$, $B_{2,i}$ and $B_{3,i}$ respectively, $B_{1,i}+B_{2,i}+B_{3,i} \leq B$. When the terminal is located in a $j^{th}$ region and the operating bandwidths of the three layers of sub-networks are $B_{1,j}$, $B_{2,j}$ and $B_{3,j}$ respectively, $B_{1,j}+B_{2,j}+B_{3,j} \leq B$. The system capacity and the rate demand in the $i^{th}$ region are different from those in the $j^{th}$ region, so $B_{1,i} \neq B_{1,j}$, $B_{2,i} \neq B_{2,j}$ and $B_{3,i} \neq B_{3,j}$.

Through the unified, coordinated processing by the network control unit, each layer of sub-network provides a service for the terminal through carrier aggregation.

It should be appreciated that, the first-layer coverage formed by the GEO satellite may be used by the terminal as a main carrier for the access, synchronization, control and low-rate data transmission, and the second-layer coverage formed by the LEO satellite and the third-layer coverage formed by the ground base station may be used by the terminal as auxiliary carriers for the high-rate data transmission.

When the terminal communicates with a network, the network monitors a change in its own operating state in real time, and the terminal notifies the network of its own information in real time, so that the network determines and processes the current operating state in a better manner. For example, when the network has detected that a satellite in one constellation sub-network among a plurality of constellation sub-networks connected to the terminal is unavailable, the network notifies the terminal to disable the connection with the unavailable satellite and communicate with the other constellation sub-network and/or the ground sub-network.

It should be appreciated that, the terminal in FIG. 4 may be in direct communication with the GEO constellation, and the ground gateway GW2 may be in communication with one or more satellites in a second LEO constellation.

Figure 5:
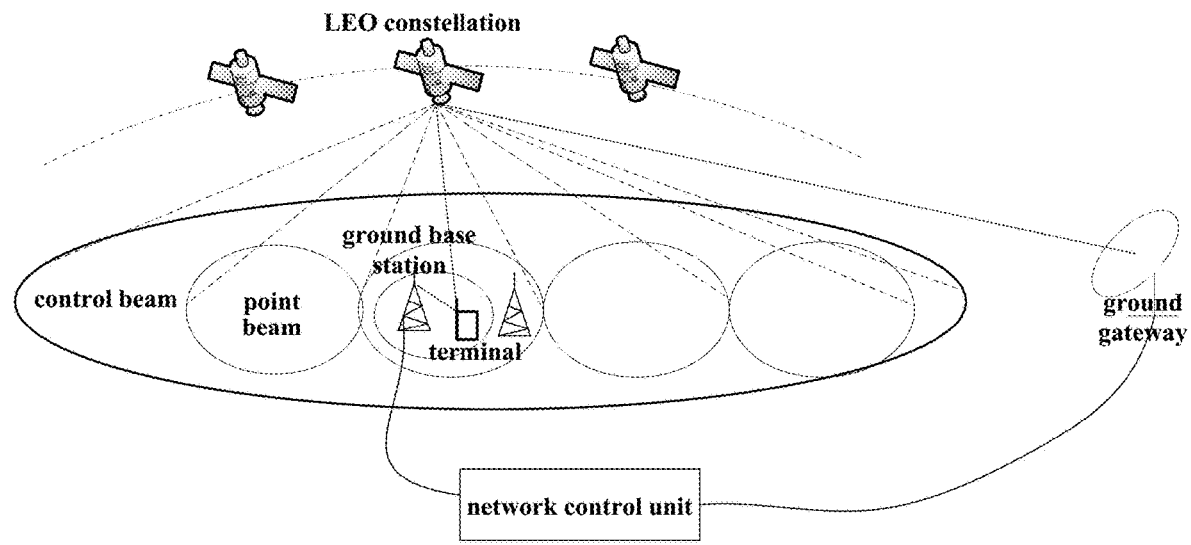
FIG. 5 is a schematic view showing a three-layer heterogeneous three-dimensional network consisting of an LEO constellation and a ground cellular base station according to an embodiment of the present disclosure.

Second Embodiment: Three-Layer Heterogeneous Three-Dimensional Network Consisting of an LEO Constellation and a Ground Cellular Base Station As shown in FIG. 5, a communication system includes an LEO constellation, a ground gateway, a ground cellular base station, a network control unit and a terminal, i.e., a three-layer heterogeneous three-dimensional hierarchical coverage is formed.

The non-ground mobile communication sub-network includes the LEO constellation, and the ground gateway in communication with the LEO constellation. The ground mobile communication sub-network includes the ground base station. The network control unit is in communication with the ground gateway and the ground base station.

For the terminal, a sub-network consisting of the LEO constellation and the ground gateway forms a two-layer coverage of control beams and point beams. The control beams form a first-layer coverage with a largest coverage area, the point beams form a second-layer coverage with a second largest coverage area, and the ground cellular base station forms a third-layer coverage with a smallest coverage area. In other words, for a region covered by the ground cellular base station where the terminal is located, there are a coverage formed by the control beams and a coverage formed by the point beams of an LEO satellite which moves rapidly.

Through the unified, coordinated processing by the network control unit, a bandwidth occupied by the sub-network formed by each layer of coverage is divided statically or dynamically.

When the operating bandwidth of the system is B MHz, in a static mode, the total bandwidth B MHz is fixedly divided into three parts not overlapping each other, i.e., $B_1$, $B_2$ and $B_3$, and $B_1+B_2+B_3 \leq B$. The three bandwidth parts are assigned to the three layers of sub-networks respectively, so that each sub-network is designed merely in accordance with the assigned bandwidth. For example, the control beam sub-network of the LEO constellation merely operates on the bandwidth $B_1$, the point beam sub-network of the LEO constellation merely operates on the bandwidth $B_2$, and the ground base station sub-network merely operates on the bandwidth $B_3$.

When the operating bandwidth of the system is B MHz, in a dynamic mode, the three layers of sub-networks are designed in accordance with the entire operating bandwidth B, but an actual operating bandwidth of each sub-network changes dynamically, i.e., the actual operating bandwidth is associated with such factors as a system capacity and a rate demand at a specific region and a specific time. Without loss of generality, when the terminal is located in an $i^{th}$ region and the operating bandwidths of the three layers of sub-networks are $B_{1,i}$, $B_{2,i}$ and $B_{3,i}$ respectively, $B_{1,i}+B_{2,i}+B_{3,i} \leq B$. When the terminal is located in a $j^{th}$ region and the operating bandwidths of the three layers of sub-networks are $B_{1,j}$, $B_{2,j}$ and $B_{3,j}$ respectively, 7

Through the unified, coordinated processing by the network control unit, each layer of sub-network provides a service for the terminal through carrier aggregation.

It should be appreciated that, the first-layer coverage formed by the control beams of the LEO satellite is used by the terminal as a main carrier for the access, synchronization, control and low-rate data transmission, and the second-layer coverage formed by the point beams of the LEO satellite and the third-layer coverage formed by the ground base station are used by the terminal as auxiliary carriers for the high-rate data transmission.

When the terminal communicates with a network, the network monitors a change in its own operating state in real time, and the terminal notifies the network of its own information in real time, so that the network determines and processes the current operating state in a better manner. For example, when the network has detected that a ground sub-network connected to the terminal is unavailable, the network notifies the terminal to disable the connection with the unavailable ground sub-network and communicate with the satellite sub-networks.

Figure 6:
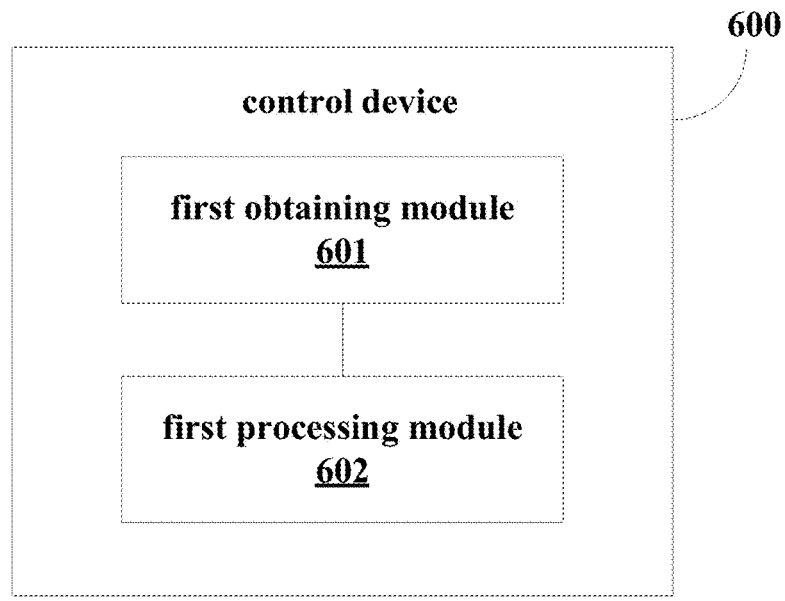
FIG. 6 is a schematic view showing a control device in a heterogeneous three-dimensional hierarchical network according to an embodiment of the present disclosure.

As shown in FIG. 6, the present disclosure provides in some embodiments a control device in a heterogeneous three-dimensional hierarchical network for a network control unit. The heterogeneous three-dimensional hierarchical network includes a ground mobile communication sub-network and a non-ground mobile communication sub-network. The control device 600 includes: a first obtaining module 601 configured to obtain a coverage mode of a terminal; and a first processing module 602 configured to: when the coverage mode is single-layered sub-network coverage, set the non-ground mobile communication sub-network or the ground mobile communication sub-network corresponding to the single-layered sub-network coverage to be in a standalone operating mode or an intra-layer carrier aggregation mode; and when the coverage mode is multi-layered sub-network coverage, set the non-ground mobile communication sub-network corresponding to the multi-layered sub-network coverage, or the ground mobile communication sub-network and the non-ground mobile communication sub-network corresponding to the multi-layered sub-network coverage, to be in a cross-layer carrier aggregation mode. The ground mobile communication sub-network and the non-ground mobile communication sub-network use a same or unified radio access technology.

In some embodiments of the present disclosure, the control device 600 further includes: a second obtaining module configured to obtain a coverage range of the ground mobile communication sub-network and/or the non-ground mobile communication sub-network; and a second processing module configured to select a signal from the sub-network with a largest coverage range as a main carrier.

In some embodiments of the present disclosure, the control device 600 further includes a first configuration module configured to configure one or more main carriers for the ground mobile communication sub-network and/or the non-ground mobile communication sub-network.

In some embodiments of the present disclosure, the main carrier is used by the terminal for data transmission at a first rate, access, synchronization, or control, an auxiliary carrier corresponding to the main carrier is used by the terminal for the data transmission at a second rate, and the first rate is smaller than the second rate.

In some embodiments of the present disclosure, the control device 600 further includes a first transmission module configured to notify the terminal of an operating mode and/or an operating bandwidth of a cell where the terminal is located.

In some embodiments of the present disclosure, the control device 600 further includes a second transmission module configured to transmit first information, and the first information is used to indicate one or more of (1) an operating frequency of the ground mobile communication sub-network and/or the non-ground mobile communication sub-network, (2) a service time of the non-ground mobile communication sub-network, or (3) a beam angle of the non-ground mobile communication sub-network.

In some embodiments of the present disclosure, the control device 600 further includes: a third obtaining module configured to obtain an operating state of the ground mobile communication sub-network and/or the non-ground mobile communication sub-network; and a third transmission module configured to transmit second information in accordance with the operating state, the second information being used to instruct the terminal to hand over between the sub-networks.

In some embodiments of the present disclosure, the control device 600 further includes a second configuration module configured to dynamically or statically configure an operating bandwidth of the non-ground mobile communication sub-network and/or the ground mobile communication sub-network.

The control device in the embodiments of the present disclosure is used to implement the above-mentioned control method in FIG. 1 with a similar principle and a similar technical effect, which will thus not be particularly defined herein.

Figure 7:
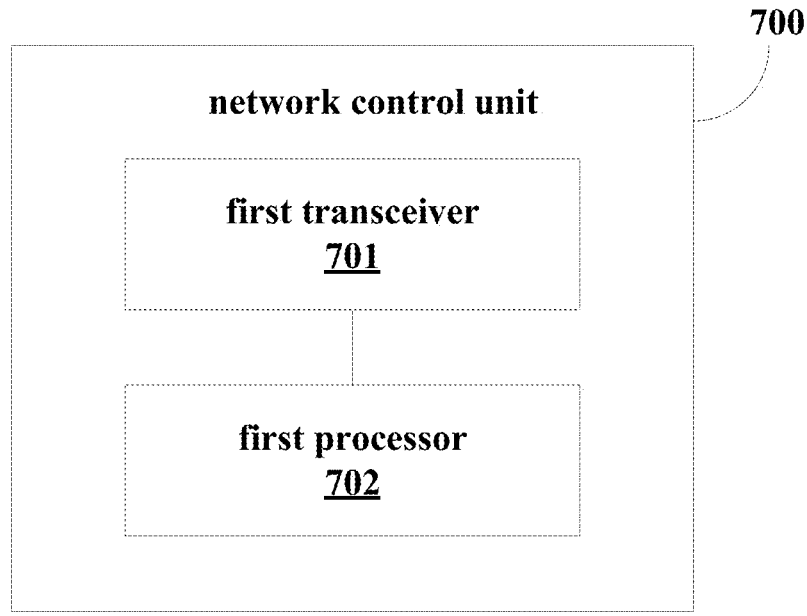
FIG. 7 is a schematic view showing a network control unit according to an embodiment of the present disclosure.

As shown in FIG. 7, the present disclosure provides in some embodiments a network control unit for a heterogeneous three-dimensional hierarchical network. The heterogeneous three-dimensional hierarchical network includes a ground mobile communication sub-network and a non-ground mobile communication sub-network. The network control unit includes a first transceiver 701 and a first processor 702. The first transceiver 701 is configured to transmit and receive data under the control of the first processor 702. The first processor 702 is configured to read a program in a memory, so as to: obtain a coverage mode of a terminal; when the coverage mode is single-layered sub-network coverage, set the non-ground mobile communication sub-network or the ground mobile communication sub-network corresponding to the single-layered sub-network coverage to be in a standalone operating mode or an intra-layer carrier aggregation mode; and when the coverage mode is multi-layered sub-network coverage, set the non-ground mobile communication sub-network corresponding to the multi-layered sub-network coverage, or the ground mobile communication sub-network and the non-ground mobile communication sub-network corresponding to the multi-layered sub-network coverage, to be in a cross-layer carrier aggregation mode. The ground mobile communication sub-network and the non-ground mobile communication sub-network use a same or unified radio access technology.

In some embodiments of the present disclosure, the first processor 702 is further configured to read the program in the memory to: obtain a coverage range of the ground mobile communication sub-network and/or the non-ground mobile communication sub-network; and select a signal from the sub-network with a largest coverage range as a main carrier.

In some embodiments of the present disclosure, the first processor 702 is further configured to read the program in the memory to: configure one or more main carriers for the ground mobile communication sub-network and/or the non-ground mobile communication sub-network.

In some embodiments of the present disclosure, the main carrier is used by the terminal for data transmission at a first rate, access, synchronization, or control, an auxiliary carrier corresponding to the main carrier is used by the terminal for the data transmission at a second rate, and the first rate is smaller than the second rate.

In some embodiments of the present disclosure, the first processor 702 is further configured to read the program in the memory to: notify the terminal of an operating mode and/or an operating bandwidth of a cell where the terminal is located.

In some embodiments of the present disclosure, the first processor 702 is further configured to read the program in the memory to: transmit first information, and the first information is used to indicate one or more of (1) an operating frequency of the ground mobile communication sub-network and/or the non-ground mobile communication sub-network, (2) a service time of the non-ground mobile communication sub-network, or (3) a beam angle of the non-ground mobile communication sub-network.

In some embodiments of the present disclosure, the first processor 702 is further configured to read the program in the memory to: obtain an operating state of the ground mobile communication sub-network and/or the non-ground mobile communication sub-network; and transmit second information in accordance with the operating state, the second information being used to instruct the terminal to hand over between the sub-networks.

In some embodiments of the present disclosure, the first processor 702 is further configured to read the program in the memory to: dynamically or statically configures an operating bandwidth of the non-ground mobile communication sub-network and/or the ground mobile communication sub-network.

The network control unit in the embodiments of the present disclosure is used to implement the above-mentioned control method in FIG. 1 with a similar principle and a similar technical effect, which will thus not be particularly defined herein.

Figure 8:
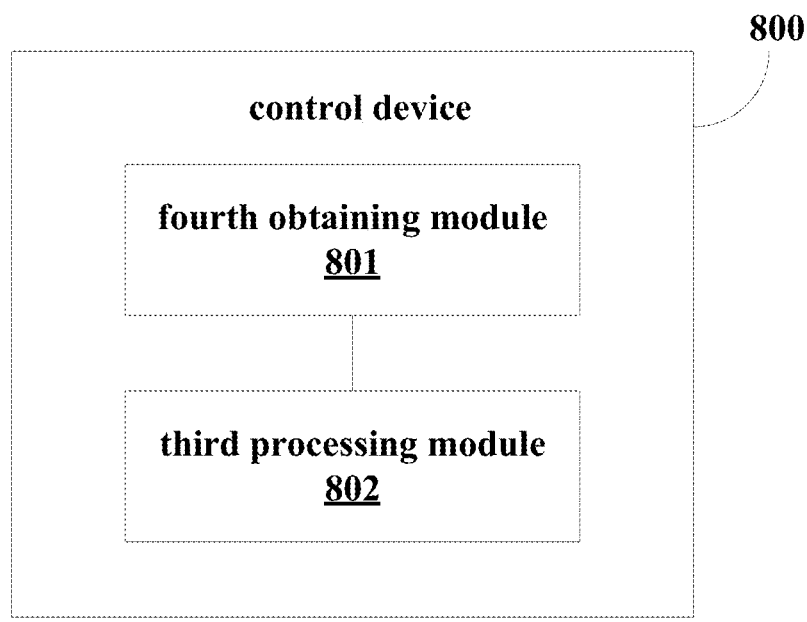
FIG. 8 is another schematic view showing the control device in the heterogeneous three-dimensional hierarchical network according to an embodiment of the present disclosure.

As shown in FIG. 8, the present disclosure provides in some embodiments a control device in a heterogeneous three-dimensional hierarchical network for a terminal. The heterogeneous three-dimensional hierarchical network includes a ground mobile communication sub-network and a non-ground mobile communication sub-network. The control device 800 includes: a fourth obtaining module 801 configured to obtain an operating mode and/or an operating bandwidth of a cell where the terminal is located; and a third processing module 802 configured to obtain an operating mode of the terminal and/or a sub-network where the terminal is located in accordance with the operating mode and/or the operating bandwidth of the cell where the terminal is located. The ground mobile communication sub-network and the non-ground mobile communication sub-network use a same or unified radio access technology.

In some embodiments of the present disclosure, the control device 800 further includes a fourth processing module configured to: when the operating mode of the terminal is a standalone operating mode, perform control and/or data transmission on a corresponding sub-network; when the operating mode of the terminal is an intra-layer carrier aggregation mode, perform data transmission at a first rate, access, synchronization, and/or control on a main carrier, and perform data transmission at a second rate on an auxiliary carrier corresponding to the main carrier, the first rate being smaller than the second rate; or when the operating mode of the terminal is a cross-layer carrier aggregation mode, perform data transmission at the first rate, access, synchronization, and/or control on a sub-network where the main carrier is located, and perform data transmission at the second rate on a sub-network where the auxiliary carrier corresponding to the main carrier is located, the first rate being smaller than the second rate.

The control device in the embodiments of the present disclosure is used to implement the above-mentioned control method in FIG. 2 with a similar principle and a similar technical effect, which will thus not be particularly defined herein.

Figure 9:
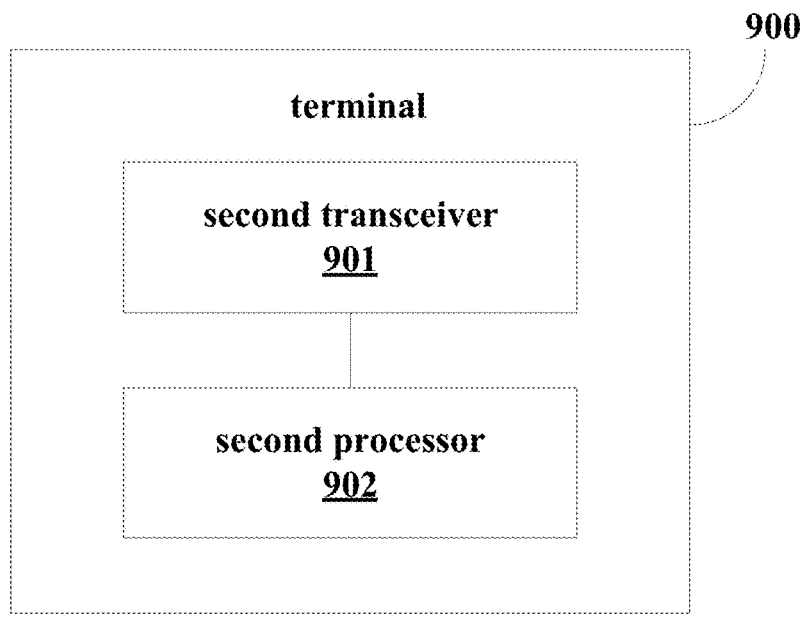
FIG. 9 is a schematic view showing a terminal according to an embodiment of the present disclosure.

As shown in FIG. 9, the present disclosure provides in some embodiments a terminal for a heterogeneous three-dimensional hierarchical network. The heterogeneous three-dimensional hierarchical network includes a ground mobile communication sub-network and a non-ground mobile communication sub-network. The control device 900 includes a second transceiver 901 and a second processor 902. The second transceiver 901 is configured to transmit and receive data under the control of the second processor 902. The second processor 902 is configured to read a program in a memory, so as to: obtain an operating mode and/or an operating bandwidth of a cell where the terminal is located; and obtain an operating mode of the terminal and/or a sub-network where the terminal is located in accordance with the operating mode and/or the operating bandwidth of the cell where the terminal is located. The ground mobile communication sub-network and the non-ground mobile communication sub-network use a same or unified radio access technology.

In some embodiments of the present disclosure, the second processor 902 is configured to read the program in the memory to: when the operating mode of the terminal is a standalone operating mode, perform control and/or data transmission on a corresponding sub-network; when the operating mode of the terminal is an intra-layer carrier aggregation mode, perform data transmission at a first rate, access, synchronization, and/or control on a main carrier, and perform data transmission at a second rate on an auxiliary carrier corresponding to the main carrier, the first rate being smaller than the second rate; or when the operating mode of the terminal is a cross-layer carrier aggregation mode, perform data transmission at the first rate, access, synchronization, and/or control on a sub-network where the main carrier is located, and perform data transmission at the second rate on a sub-network where the auxiliary carrier corresponding to the main carrier is located, the first rate being smaller than the second rate.

The terminal in the embodiments of the present disclosure is used to implement the above-mentioned control method in FIG. 2 with a similar principle and a similar technical effect, which will thus not be particularly defined herein.

Figure 10:
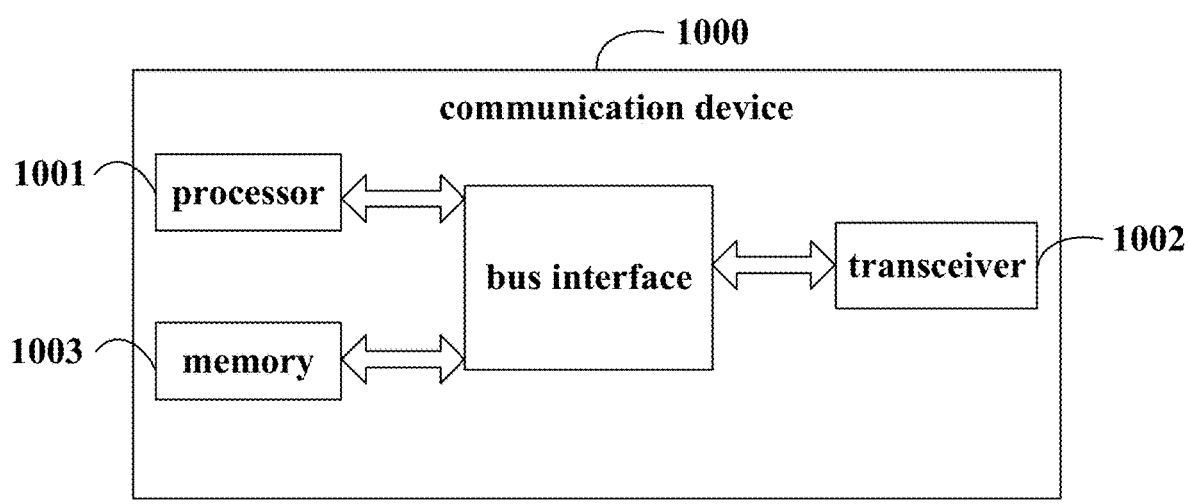
FIG. 10 is a schematic view showing a communication device according to an embodiment of the present disclosure.

As shown in FIG. 10, the present disclosure provides in some embodiments a communication device 1000 which includes a processor 1001, a transceiver 1002, a memory 1003 and a bus interface. The communication device 1000 further includes a program stored in the memory 1003 and executed by the processor 1001. The program is executed by the processor 1001 so as to implement the steps in the control methods in FIGS. 1 and 2.

In FIG. 10, bus architecture may include a number of buses and bridges connected to each other, so as to connect various circuits for one or more processors 1001 and one or more memories 1003. In addition, as is known in the art, the bus architecture may be used to connect any other circuits, such as a circuit for a peripheral device, a circuit for a voltage stabilizer and a power management circuit. The bus interface may be provided, and the transceiver 1002 may consist of a plurality of elements, i.e., a transmitter and a receiver for communication with any other devices over a transmission medium. It should be appreciated that, the transceiver 1002 is an optional member.

The processor 1001 may take charge of managing the bus architecture as well as general processings. The memory 1003 may store therein data for the operation of the processor 1001.

The communication device in the embodiments of the present disclosure is used to implement the above-mentioned control methods in FIGS. 1 and 2 with a similar principle and a similar technical effect, which will thus not be particularly defined herein.

The steps of the methods or algorithm described in conjunction with the contents mentioned hereinabove may be implemented through hardware, or implemented by a processor executing instructions. The instructions may consist of corresponding modules stored in a Random Access Memory (RAM), a flash memory, a Read-Only Memory (ROM), an Erasable Programmable Read-Only Memory (EPROM), an Electrically Erasable Programmable Read-Only Memory (EEPROM), a register, a hard disk, a mobile hard disk, a read-only optic disk, or any other known storage medium. Illustratively, the storage medium may be coupled to the processor, so that the processor is capable of reading information from the storage medium and writing information into the storage medium. It should be noted that, the storage medium may be a component of the processor. The processor and the storage medium may be located in an Application Specific Integrated Circuit (ASIC). In addition, the ASIC may be located in an interface device of a core network. Alternatively, the processor and the storage medium may be located in the interface device of the core network as discrete assemblies.

It should be appreciated that, the functions described in one or more embodiments of the present disclosure may be achieved through hardware, software, firmware or a combination thereof. When the functions are achieved through software, these functions may be stored in the computer-readable medium or transmitted as one or more instructions or codes on the computer-readable medium. The computer-readable medium may include a computer-readable storage medium and a communication medium. The communication medium may include any medium capable of transmitting a computer program from one place to another place. The storage medium may include any available medium capable of being accessed by a general-purpose or dedicated computer.

The objects, the technical solutions and the beneficial effects of the present disclosure have been described hereinabove in details. It should be appreciated that, the above description may be for illustrative purposes only, but shall not be used to limit the scope of the present disclosure. Any modifications, equivalents or improvements shall also fall within the scope of the present disclosure.

It should be appreciated that, the present disclosure may be provided as a method, a system or a computer program product, so the present disclosure may be in the form of full hardware embodiments, full software embodiments, or combinations thereof. In addition, the present disclosure may be in the form of a computer program product implemented on one or more computer-readable storage mediums (including but not limited to disk memory, compact disc-read only memory (Compact Disc-Read Only Memory, CD-ROM) and optical memory) including computer-readable program codes.

The present disclosure has been described with reference to the flow charts and/or block diagrams of the method, device (system) and computer program product according to the embodiments of the present disclosure. It should be understood that computer program instructions may be used to implement each of the work flows and/or blocks in the flow charts and/or the block diagrams, and the combination of the work flows and/or blocks in the flow charts and/or the block diagrams. These computer program instructions may be provided to a processor of a common computer, a dedicated computer, an embedded processor or any other programmable data processing devices to create a machine, so that instructions capable of being executed by the processor of the computer or the other programmable data processing devices may create a device to achieve the functions assigned in one or more work flows in the flow chart and/or one or more blocks in the block diagram.

These computer program instructions may also be stored in a computer readable storage that may guide the computer or the other programmable data process devices to function in a certain way, so that the instructions stored in the computer readable storage may create a product including an instruction unit which achieves the functions assigned in one or more flows in the flow chart and/or one or more blocks in the block diagram.

These computer program instructions may also be loaded in the computer or the other programmable data process devices, so that a series of operation steps are executed on the computer or the other programmable devices to create processes achieved by the computer. Therefore, the instructions executed in the computer or the other programmable devices provide the steps for achieving the function assigned in one or more flows in the flow chart and/or one or more blocks in the block diagram.

It should be further appreciated that, the device and method may be implemented in any other ways. For example, the embodiments for the apparatus is merely for illustrative purposes, and the modules or units are provided merely on the basis of their logic functions. During the actual application, some modules or units may be combined together or integrated into another system. Alternatively, some functions of the module or units may be omitted or not executed. In addition, the coupling connection, direct coupling connection or communication connection between the modules or units may be implemented via interfaces, and the indirect coupling connection or communication connection between the modules or units may be implemented in an electrical or mechanical form or in any other form.

The units may be, or may not be, physically separated from each other. The units for displaying may be, or may not be, physical units, i.e., they may be arranged at an identical position, or distributed on a plurality of network elements. Parts or all of the units may be selected in accordance with the practical need, so as to achieve the purpose of the present disclosure.

In addition, the functional units in the embodiments of the present disclosure may be integrated into a processing unit, or the functional units may exist independently, or two or more functional units may be combined together.

Obviously, a person skilled in the art can make various changes and modifications to the embodiments of the present disclosure without departing from the spirit and scope of the present disclosure. Therefore, if these modifications and variations of the embodiments of the present disclosure fall within the scope of the claims of the present disclosure and their equivalent technologies, the present disclosure also intends to include these modifications and variations.

What is claimed is:

1. A control method that is in a heterogeneous three-dimensional hierarchical network and for a network control unit, wherein the heterogeneous three-dimensional hierarchical network comprises a ground mobile communication sub-network and a non-ground mobile communication sub-network, and the control method comprises:
   obtaining a coverage mode of a terminal;
   when the coverage mode is single-layered sub-network coverage, setting the non-ground mobile communication sub-network or the ground mobile communication sub-network corresponding to the single-layered sub-network coverage to be in a standalone operating mode or an intra-layer carrier aggregation mode; and
   when the coverage mode is multi-layered sub-network coverage, setting the non-ground mobile communication sub-network corresponding to the multi-layered sub-network coverage, or the ground mobile communication sub-network and the non-ground mobile communication sub-network corresponding to the multi-layered sub-network coverage, to be in a cross-layer carrier aggregation mode,
   wherein the ground mobile communication sub-network and the non-ground mobile communication sub-network use a same or unified radio access technology.

2. The control method according to claim 1, further comprising:
   obtaining a coverage range of the ground mobile communication sub-network and/or the non-ground mobile communication sub-network;
   selecting a signal from the sub-network with a largest coverage range as a main carrier.

3. The control method according to claim 1, further comprising:

configuring one or more main carriers for the ground mobile communication sub-network and/or the non-ground mobile communication sub-network.

4. The control method according to claim 2, wherein the main carrier is used by the terminal for data transmission at a first rate, access, synchronization, and/or control, an auxiliary carrier corresponding to the main carrier is used by the terminal for the data transmission at a second rate, and the first rate is smaller than the second rate.

5. The control method according to claim 1, further comprising:
notifying the terminal of an operating mode and/or an operating bandwidth of a cell where the terminal is located.

6. The control method according to claim 1, further comprising:
transmitting first information, wherein the first information is used to indicate one or more of:
an operating frequency of the ground mobile communication sub-network and/or the non-ground mobile communication sub-network;
a service time of the non-ground mobile communication sub-network; or
a beam angle of the non-ground mobile communication sub-network.

7. The control method according to claim 1, further comprising:
obtaining an operating state of the ground mobile communication sub-network and/or the non-ground mobile communication sub-network;
transmitting second information in accordance with the operating state, the second information being used to instruct the terminal to hand over between the sub-networks.

8. The control method according to claim 1, further comprising:
dynamically or statically configuring an operating bandwidth of the non-ground mobile communication sub-network and/or the ground mobile communication sub-network.

9. A control method that is in a heterogeneous three-dimensional hierarchical network and for a terminal, wherein the heterogeneous three-dimensional hierarchical network comprises a ground mobile communication sub-network and a non-ground mobile communication sub-network, and the control method comprises:
obtaining an operating mode and/or an operating bandwidth of a cell where the terminal is located; and
obtaining an operating mode of the terminal and/or a sub-network where the terminal is located in accordance with the operating mode and/or the operating bandwidth of the cell where the terminal is located,
wherein the ground mobile communication sub-network and the non-ground mobile communication sub-network use a same or unified radio access technology;
wherein the control method further comprises:
when the operating mode of the terminal is a standalone operating mode, performing control and/or data transmission on a corresponding sub-network;
or
when the operating mode of the terminal is an intra-layer carrier aggregation mode, performing data transmission at a first rate, access, synchronization, and/or control on a main carrier, and performing data transmission at a second rate on an auxiliary carrier corresponding to the main carrier, the first rate being smaller than the second rate;
or
when the operating mode of the terminal is a cross-layer carrier aggregation mode, performing data transmission at the first rate, access, synchronization, and/or control on a sub-network where the main carrier is located, and performing data transmission at the second rate on a sub-network where the auxiliary carrier corresponding to the main carrier is located, the first rate being smaller than the second rate.

10. A communication system, comprising a heterogeneous three-dimensional hierarchical network, a terminal and a network control unit, wherein the heterogeneous three-dimensional hierarchical network comprises a ground mobile communication sub-network and a non-ground mobile communication sub-network, wherein
the terminal is in communication with the ground mobile communication sub-network and the non-ground mobile communication sub-network;
the network control unit is in communication with the ground mobile communication sub-network and the non-ground mobile communication sub-network;
the ground mobile communication sub-network and the non-ground mobile communication sub-network use a same or unified radio access technology;
the network control unit comprising a first transceiver and a first processor,
wherein the first transceiver is configured to transmit and receive data under the control of the first processor,
wherein the first processor is configured to read a program in a memory to implement:
obtaining a coverage mode of a terminal;
when the coverage mode is single-layered sub-network coverage, setting the non-ground mobile communication sub-network or the ground mobile communication sub-network corresponding to the single-layered sub-network coverage to be in a standalone operating mode or an intra-layer carrier aggregation mode; and
when the coverage mode is multi-layered sub-network coverage, setting the non-ground mobile communication sub-network corresponding to the multi-layered sub-network coverage, or the ground mobile communication sub-network and the non-ground mobile communication sub-network corresponding to the multi-layered sub-network coverage, to be in a cross-layer carrier aggregation mode;
the terminal comprising a second transceiver and a second processor,
wherein the second transceiver is configured to transmit and receive data under the control of the second processor,
wherein the second processor is configured to read a program in a memory to implement:
obtaining an operating mode and/or an operating bandwidth of a cell where the terminal is located; and
obtaining an operating mode of the terminal and/or a sub-network where the terminal is located in accordance with the operating mode and/or the operating bandwidth of the cell where the terminal is located,
wherein the second processor is configured to read a program in a memory to implement:
when the operating mode of the terminal is a standalone operating mode, performing control and/or data transmission on a corresponding sub-network:
or
when the operating mode of the terminal is an intra-layer carrier aggregation mode, performing data transmission at a first rate, access, synchronization, and/or control on a main carrier, and performing data transmission at a second rate on an auxiliary carrier corresponding to the main carrier, the first rate being smaller than the second rate;
or when the operating mode of the terminal is a cross-layer carrier aggregation mode, performing data transmission at the first rate, access, synchronization, and/or control on a sub-network where the main carrier is located, and performing data transmission at the second rate on a sub-network where the auxiliary carrier corresponding to the main carrier is located, the first rate being smaller than the second rate.

11. The communication system according to claim 10, wherein the network control unit is arranged independent of a network side device in the ground mobile communication sub-network and a network side device in the non-ground mobile communication sub-network; or the network control unit is arranged in the network side device in the ground mobile communication sub-network or the network side device in the non-ground mobile communication sub-network.

12. The communication system according to claim 10, wherein a cell coverage region formed by the non-ground mobile communication sub-network is greater than a cell coverage region formed by the ground mobile communication sub-network;
or the cell coverage region formed by the ground mobile communication sub-network partially overlaps the cell coverage region formed by the non-ground mobile communication sub-network;
or the cell coverage region formed by the ground mobile communication sub-network does not overlap the cell coverage region formed by the non-ground mobile communication sub-network.

13. The communication system according to claim 10, wherein a network type of the ground mobile communication sub-network comprises one or more of a macrocell network, a microcell network or a device-to-device network.

14. The communication system according to claim 10, wherein the non-ground mobile communication sub-network comprises an aerospace device; or the non-ground mobile communication sub-network comprises the aerospace device and a ground gateway, and the aerospace device comprises one or more of a satellite constellation, a high altitude platform station or an aircraft.

15. The communication system according to claim 14, wherein a network coverage mode of the satellite constellation comprises one of:
- a single-layer sub-network coverage of satellite constellations at a same earth orbit;
- a multi-layer sub-network coverage of the satellite constellations at a same earth orbit; or
- a multi-layer sub-network coverage of the satellite constellations at different earth orbits.

16. The communication system according to claim 15, wherein the single-layer sub-network coverage of the satellite constellations at a same earth orbit comprises one of:
- a single-layer sub-network coverage of a Geostationary Earth Orbit (GEO) constellation;
- a single-layer sub-network coverage of a Medium Earth Orbit (MEO) constellation; or
- a single-layer sub-network coverage of a Low Earth Orbit (LEO) constellation.

17. The communication system according to claim 15, wherein the multi-layer sub-network coverage of the satellite constellations at a same earth orbit comprises a sub-network coverage of control beams and point beams of the satellite constellations at the same earth orbit.

18. A network control unit for a heterogeneous three-dimensional hierarchical network, the heterogeneous three-dimensional hierarchical network comprising a ground mobile communication sub-network and a non-ground mobile communication sub-network, the network control unit comprising a first transceiver and a first processor, wherein the first transceiver is configured to transmit and receive data under the control of the first processor, wherein the first processor is configured to read a program in a memory to implement the control method according to claim 1.

19. A terminal for a heterogeneous three-dimensional hierarchical network, the heterogeneous three-dimensional hierarchical network comprising a ground mobile communication sub-network and a non-ground mobile communication sub-network, the control device comprising a second transceiver and a second processor, wherein the second transceiver is configured to transmit and receive data under the control of the second processor, wherein the second processor is configured to read a program in a memory to implement the control method according to claim 9.

* * * * *